United States Patent
Sawatzki et al.

(10) Patent No.: US 11,447,181 B2
(45) Date of Patent: Sep. 20, 2022

(54) STRUCTURAL COMPONENT FOR A SUPERSTRUCTURE OF A VEHICLE, AND VEHICLE SUPERSTRUCTURE

(71) Applicant: Ford Global Technologies, LLC, Dearborn, MI (US)

(72) Inventors: Marius Sawatzki, Pulheim (DE);
Stefan Schneider, Rösrath (DE);
Michael Spurling, Romford (GB);
Joergen Hilmann, Leverkusen (DE);
Dominik Mueller, Euskirchen (DE);
Daniel Meckenstock, Wuppertal (DE)

(73) Assignee: Ford Global Technologies, LLC, Dearborn, MI (US)

( * ) Notice: Subject to any disclaimer, the term of this patent is extended or adjusted under 35 U.S.C. 154(b) by 262 days.

(21) Appl. No.: 16/823,152

(22) Filed: Mar. 18, 2020

(65) Prior Publication Data

US 2020/0298911 A1 Sep. 24, 2020

(30) Foreign Application Priority Data

Mar. 20, 2019 (DE) .......................... 102019203758.5

(51) Int. Cl.
| | |
|---|---|
| *B62D 21/02* | (2006.01) |
| *B62D 21/15* | (2006.01) |
| *B60R 19/02* | (2006.01) |
| *B62D 25/08* | (2006.01) |
| *B62D 25/20* | (2006.01) |

(52) U.S. Cl.
CPC ............ *B62D 21/02* (2013.01); *B60R 19/023* (2013.01); *B62D 21/15* (2013.01); *B62D 25/08* (2013.01); *B62D 25/082* (2013.01); *B62D 25/2045* (2013.01)

(58) Field of Classification Search
CPC .. B62D 21/02; B62D 25/082; B62D 25/2045; B62D 21/15; B62D 25/08; B60R 19/023
USPC .................................................... 296/193.07
See application file for complete search history.

(56) References Cited

U.S. PATENT DOCUMENTS

| | | | |
|---|---|---|---|
| 6,131,685 A * | 10/2000 | Sakamoto ............ | B62D 21/152 180/232 |
| 7,762,619 B2 | 7/2010 | Baccouche et al. | |
| 8,596,712 B2 | 12/2013 | Miller et al. | |
| 8,646,790 B2 * | 2/2014 | Young .................. | B62D 21/155 280/124.109 |
| 9,073,503 B2 | 7/2015 | Ookubo et al. | |
| 9,421,865 B2 | 8/2016 | Bernardi et al. | |
| 2017/0073014 A1 | 3/2017 | Alwan et al. | |
| 2018/0065669 A1 | 3/2018 | Ghislieri et al. | |

FOREIGN PATENT DOCUMENTS

FR 2789031 A 8/2000

* cited by examiner

*Primary Examiner* — D Glenn Dayoan
*Assistant Examiner* — Dana D Ivey
(74) *Attorney, Agent, or Firm* — Vincent Mastrogiacomo; McCoy Russell LLP (57) ABSTRACT

Systems are provided for a structural element. In one example, a system comprises a structural element arranged between a steering column and a front bumper, wherein the structural element at least partially surrounds the steering column.

18 Claims, 9 Drawing Sheets

PRIOR ART

STRUCTURAL COMPONENT FOR A SUPERSTRUCTURE OF A VEHICLE, AND VEHICLE SUPERSTRUCTURE

CROSS REFERENCE TO RELATED APPLICATION

The present application claims priority to German patent application No. 102019203758.5, filed on Mar. 20, 2019. The entire contents of the above-listed application are hereby incorporated by reference for all purposes.

FIELD

The present description relates generally to a structural component for a superstructure of a vehicle.

BACKGROUND/SUMMARY

In a frontal collision with side offset such as. when an object collides non-centrally with a front of the vehicle, such as for example in standardized crash tests with an overlap of a deformable barrier with the vehicle front of around 40%, the engine bay may be deformed, which may lead to a rotation of the drive train (e.g. internal combustion engine and transmission) normally accommodated in the engine bay. This rotation of the drive train may take place about the transverse axis (herein referred to below also as the Y-axis) of the drive train and/or about the vertical axis (herein referred to below also as the Z-axis) of the drive train, and leads to a force transfer into a bulkhead which may separate the engine bay from the vehicle interior, in particular in the region of the pedals e.g. clutch pedal, brake pedal etc., and/or a steering column of the vehicle. The bulkhead may comprise a metal plate of specific thickness. The movement or rotation of the drive train due to the frontal collision with side offset may lead, even with relatively small force transfer, directly to separation of the bulkhead from the engine bay.

The separation of the bulkhead in the pedal region may also include where the bulkhead advances toward a cabin interior. The rotation/twist of the drive train about the vertical axis or Z-axis towards the steering column may lead to a force transfer into the steering column and to an associated shift of the steering column into the vehicle interior, which may be undesired.

U.S. Pat. No. 9,073,503B2 discloses a capture device provided at the side on a drive train which, on a frontal collision of a vehicle with significant side offset (i.e. minimal overlap), can come into engagement with a counterpiece mounted on the bumper, depending on the rotation of the bumper about its vertical axis caused by the frontal collision, and cause a rotation of the drive train about its vertical axis in order, in comparison with vehicle superstructures without this capture device, to be able to absorb and dissipate significantly more collision energy on frontal collisions with minimal overlap.

Furthermore, patent application FR 2,789,031 B1 discloses a vehicle superstructure in which protrusions or stops extending substantially in the vehicle vertical direction are attached to respective longitudinal members of the vehicle superstructure on both sides of the vehicle behind a drive train and behind a steering linkage, viewed starting from a vehicle front. On a frontal collision of the vehicle, these may prevent a shift of the drive train in the direction of the vehicle interior.

U.S. application number 2017/0073014A1 and U.S. Pat. No. 9,421,865B2 each disclose a capture device attached to a drive train of a vehicle, with which a longitudinal member, that is deformed or crumpled following a frontal collision with side offset, can come into engagement and hence cause an additional force transfer into the drive train in order to be able to dissipate more collision energy.

A motor vehicle known from U.S. application number 2018/0065669A1 has a thrust rod which is attached laterally on the outside to a corresponding longitudinal member of a vehicle superstructure and runs sloping at a specific angle relative to the longitudinal member, and which is intended to bend the longitudinal member inward on a frontal collision with small overlap, in order to achieve an additional lateral force transfer of the collision energy into a drive train.

U.S. Pat. No. 6,131,685A describes a pedal floor of a vehicle which is configured such that it displaces the vehicle drive train below the passenger cell on a frontal collision of the vehicle.

U.S. Pat. No. 7,762,619B2 describes further precautions (e.g. in the form of cross-sectional constrictions) on longitudinal members of the vehicle superstructure in its frontal region which, on a frontal collision of the vehicle, lead to a specific deformation of the respective longitudinal member and thus form so-called crash joints (similar to the function of conventional film joint or film hinges).

U.S. Pat. No. 8,596,712B2 furthermore describes a capture device which is provided on a fan motor of an air-conditioning system of a vehicle, arranged between a drive train and a dashboard, with which the drive train rotating about its transverse axis on a frontal collision of the vehicle can come into engagement, in order to separate the fan motor or a lower portion from the air conditioning system and move it away from the dashboard in the direction of the vehicle floor, so as to limit movement of the fan motor toward the vehicle interior.

In this context, the present disclosure is based on the object of providing a structural component for a superstructure of a vehicle, and an improved superstructure of a vehicle, i.e. a vehicle superstructure, which significantly reduces the risk of injury to vehicle occupants, for example vehicle occupants seated on the front seats of the vehicle, in a frontal collision and in particular in a frontal collision of the vehicle with side offset, for example with an overlap of the vehicle front with a colliding obstacle of less than around 50%. Furthermore, both the structural component and the vehicle superstructure are simple to construct and economic to produce.

In one example, movement of a drive train may be limited by a structural component for a superstructure of a vehicle, comprising a first and a second elongate longitudinal structural element which are spaced apart from each other and extend at least in portions substantially in the same longitudinal direction, an elongate transverse structural element which connects the two longitudinal structural elements together and extends substantially transversely to the two longitudinal structural elements, and an elongate structural support web which extends substantially both transversely to the two longitudinal structural elements and to the transverse structural element, wherein the two longitudinal structural elements and the structural support web are each configured to be connected to the superstructure of the vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a component configured to adjust longitudinal movement of a drive train in the event of an offset frontal collision. In the prior art, which is shown in FIGS. 1, 2A, 2B, and 3, comprises where the drive train is free to be uncontrollably displaced in a longitudinal direction toward a steering column and a vehicle interior.

In the present embodiment, which is illustrated in FIGS. 4, 5, 6A, 6B, 7, 8A, 8B, 9A, 9B, 10A, and 10B, a component may be coupled to a longitudinal member and a cross-member wherein the component may be configured to absorb and redirect a force of the drive train away from the longitudinal direction. In this way, movement of the drive train toward the steering column and the vehicle interior may be reduced relative to the prior art.

According to the disclosure, a structural component for a superstructure of a vehicle, in particular a motor vehicle, comprises a first and a second elongate, longitudinal structural element which are spaced apart from each other and extend at least in portions substantially in the same longitudinal direction. The longitudinal direction in the present case is the extension direction of the longitudinal structural elements in their respective elongate direction, which is also referred to below as the main extension direction or main longitudinal extension direction of the respective longitudinal structural elements.

The term "elongate" in the context of the disclosure generally describes a component in which the extension in one spatial direction (in the present case, the longitudinal direction) is significantly greater than its extension in the other two spatial directions standing perpendicularly to each other (transverse and vertical directions), in particular greater by a multiple, for example by at least 3, 4, 5 or 10 times or even more.

Furthermore, the structural component according to the disclosure comprises an elongate transverse structural element which connects the two longitudinal structural elements together and extends substantially transversely to the two longitudinal structural elements. In other words, the transverse structural element runs in its elongate direction (longitudinal direction of the transverse structural element) transversely to the longitudinal direction of the longitudinal structural elements. The longitudinal extension of the transverse structural element transversely to the longitudinal extension of the respective longitudinal structural elements may in particular lie at an angle of around 90°, preferably in any case at an angle of greater than or equal to 45° and less than or equal to 90°.

The structural component according to the disclosure also comprises an elongate structural support web which extends substantially transversely to both longitudinal structural elements and to the transverse structural element. Thus the longitudinal extension of the structural support web (course of its elongate direction) runs both transversely to the longitudinal extension direction of the longitudinal structural elements and also to that of the transverse structural element, so that the elements forming the structural component, e.g., the longitudinal structural elements, the transverse structural element, and the structural support web, do not run in a common plane and in such case would form a "flat" structural component, but form a structural component expanded in three-dimensional space and extending therein.

In addition, the two longitudinal structural elements and the structural support web are each configured such that they can be connected to the superstructure of the vehicle. In other words, the above-mentioned structural elements (i.e. at least the two longitudinal elements and the support web) have an element portion which is configured and arranged to allow a respective connection to the vehicle superstructure, for example by form fit e.g. via one or more of bolts, rivets etc., or by substance bonding e.g. by welding, bonding etc. For example, the respective element portion of the corresponding structural elements may, when a form-fit connection method is used, have a bore through which a screw, bolt, rivet or similar is placed and connected to the vehicle superstructure. When a substance-bonding method is used, the respective structural component portion may have a corresponding bonding or welding face, for example in the form of a bonding or welding flange.

It should be noted that the structural component according to the disclosure is configured substantially smaller in comparison with the spatial dimensions of a vehicle superstructure. While the entire vehicle superstructure extends, at least in its longitudinal and/or transverse direction, for example in the range of one or more meters, the structural component according to the disclosure measures, in its longitudinal, transverse and vertical directions, rather in the range of a few centimeters, for example in the range between around 5 cm and maximum 50 cm, and more specifically between around 10 cm and 30 cm.

In addition, it should be understood that the structural component according to the disclosure is generally configured for a vehicle superstructure such that (e.g., in its form, geometry, material, material thickness and similar) it can in particular be loaded by compression and/or tension and/or bending and withstand corresponding forces up to a predefinable maximum without itself being significantly plastically deformed. Only when the maximum load-bearing capacity is exceeded does plastic deformation of the structural component take place, e.g., of individual or several of the structural elements described above.

The structural component according to the disclosure, because of its low number of individual structural elements and its simple arrangement, has a structure which is both simple and economic to produce. High quantities can be produced rationally and economically without high cost. When the structural component according to the disclosure is arranged on a frontal portion of a vehicle superstructure, for example on a longitudinal member and/or crossmember of the vehicle superstructure, in particular when the structural component is physically arranged between a drive train of the vehicle arranged in the frontal portion or engine bay of the vehicle (e.g. internal combustion engine and transmission, or electric motor and similar) and a bulkhead of the vehicle which separates a vehicle interior from the engine bay of the vehicle, a rotation of the drive train caused in particular by a frontal collision with side offset and low overlap (e.g. less than or equal to 40%) because of a deformation occurring mainly in a side portion of the engine bay, can be reduced and the associated force transfer from the drive train can be diverted into the vehicle superstructure (e.g. under the passenger cell) such that an excessive deformation of the bulkhead is effectively prevented. With the structural component according to the disclosure, with corresponding design and attachment to the vehicle superstructure, a rotation of the drive train both about the transverse axis (herein referred to below also the Y-axis) of the drive train and also about the vertical axis (herein referred to also below as the Z-axis) of the drive train can be effectively countered. Accordingly, the risk of injury to a vehicle occupant, seated behind the bulkhead in a vehicle interior, on such a frontal collision is substantially reduced, in particular in the foot and leg region of the vehicle occupants.

According to an advantageous embodiment of the disclosure, with a view to high stability (high load-bearing capacity) and simultaneously simple construction and low weight, the two longitudinal structural elements and the transverse structural element substantially form a U-shape or arch shape. In other words, the two longitudinal structural elements spaced apart from each other in this embodiment form the two legs of the U-shape, which are connected together by the transverse structural element running transversely thereto.

According to a further advantageous embodiment of the disclosure, the transverse structural element may also be configured integrally with at least one of the two longitudinal structural elements and formed by corresponding forming of a single workpiece, for example by bending, casting and similar. It is also conceivable that both longitudinal structural elements and the transverse structural element are formed from a single workpiece by corresponding forming. Also, in addition or alternatively, the structural support web may be formed integrally with at least one of the two longitudinal structural elements and formed by corresponding forming of a single workpiece. The integral formation of at least one of the two longitudinal structural elements with the transverse structural element and/or the structural support web saves at least one mounting step (connection of individual structural elements) and also provides both a solid and a ductile connection between the corresponding structural elements. The ductile but fixed connection allows, in particular in the case of a frontal collision of the vehicle, a temporally longer deformation of the structural component according to the disclosure and hence a higher energy dissipation, which cannot be guaranteed by a connection between individual structural elements which yields or breaks shortly after the onset of deformation of the structural component.

According to a further advantageous embodiment of the disclosure, the first longitudinal structural element and/or the second longitudinal structural element and/or the transverse structural element and/or the structural support web are/is configured as profile webs. The profile or cross-sectional profile of the respective profile webs may be angular, e.g. square, rectangular, trapezoid, generally polygonal and similar, or round, e.g. circular or ellipsoid, or consist of a combination of several cross-sectional profiles.

Preferably, according to a further advantageous embodiment of the disclosure, the profile web may have a hollow profile. In this way, firstly the stability of the profile webs can be increased, and secondly the weight of the entire structural component can be reduced.

A further advantageous embodiment of the disclosure provides that the transverse structural element is configured as a strip. This may result in that the thickness of the transverse structural element is substantially smaller than its width and length. In other words, in this embodiment the transverse structural element may be formed very flat with a closed cross-section (solid cross-section), so that the structural component according to the disclosure may advantageously be used in particular in cases in which only a very limited space on the vehicle superstructure is available for arrangement of the entire structural component, since due to the strip-like design of the transverse structural element, the structural component as a whole is extremely compact. The strip-like transverse structural element, despite its flat shape, may have a high tensile load-bearing capacity, so that it can still be used for safe capture or catchment of the drive train moving or rotating because of the frontal collision.

According to a further advantageous embodiment of the disclosure, the two longitudinal structural elements and the transverse structural element between them establish the periphery of an opening. Thus it is also possible to guide a further component of the vehicle, in particular a steering column—which is a particularly safety-relevant part of the vehicle—through this opening. The structural component according to the disclosure is then arranged in the form of a protective arch around this vehicle component, e.g. the steering column. In an embodiment which is particularly simple to construct, the opening may for example be provided in that the structural component is formed in the embodiment according to the disclosure as described above, in which the two longitudinal structural elements and the transverse structural element form a U-shape and the space between these structural elements remains free. When a steering column is guided through the opening and hence is protected by the structural component from excessive force transfer from the drive train which is moving or rotating because of the frontal collision, in this embodiment, the structural component according to the disclosure further reduces the risk of injury to a vehicle occupant seated on the driver's side, since the penetration of the steering column into the vehicle interior is prevented or at least substantially attenuated. Also, breakage of the safety-relevant steering column, and hence a mechanical interruption between a steering wheel attached to one end of the steering column and the steered vehicle wheels at the other end, is effectively prevented. The dimensions of the structural component, i.e. the diameter of the opening, for example the mutual spacing between the two longitudinal structural elements as in the above-mentioned U-shape, is established according to the vehicle component to be guided through the opening (e.g. the steering column).

According to a further particularly advantageous embodiment of the disclosure, the first and/or the second longitudinal structural element have/has a first bend about a first bending axis and/or a second bend about a second bending axis. Preferably, the first bending axis runs perpendicularly to the longitudinal direction of the respective longitudinal structural element, and the second bending axis runs perpendicularly to the first bending axis and perpendicularly to the longitudinal direction of the corresponding longitudinal structural element. Thus with relatively low complexity, the three-dimensional geometry of the structural component according to the disclosure can be adapted or designed according to an installation space actually available on the vehicle, a specific arrangement on the vehicle superstructure and/or a defined load situation to be resisted in a frontal collision, in particular with side offset.

It should be understood that the transverse structural element and/or the structural support web may also be provided with a first and/or second bend in order to obtain even more flexibility in the geometric design of the structural component.

According to a further aspect of the disclosure, a vehicle superstructure has a longitudinal member and a crossmember connected thereto and running substantially transversely thereto. The vehicle superstructure furthermore comprises a structural component according to any of the above-mentioned embodiments, wherein the structural support web is connected to the longitudinal member, and one of the two longitudinal structural elements is connected to the crossmember and the other longitudinal structural element is connected to the crossmember and/or to the longitudinal member. Thus the structural component has at least three connection points via which it is attached to the vehicle superstructure. Since, as already explained above, the structural component has an expanded three-dimensional geometry/extension because of the arrangement of its longitudinal structural elements, transverse structural element and structural support web, and since the structural component is arranged in a connecting region of the longitudinal member to the crossmember on the vehicle superstructure, i.e. in a corner region of this arrangement, the structural component at the same time gives the longitudinal member and/or crossmember an improved stability with respect to bending about a bending axis running transversely to the respective longitudinal direction of the corresponding member. Thus on a shift and/or rotation of the drive train of the vehicle following a frontal collision, the structural component also counters a bending in the longitudinal member, which is thereby particularly loaded, about its transverse axis (bending upward or downward) and/or its vertical axis (bending laterally to the right or left).

The connection or attachment of the structural component to or on the vehicle superstructure may, as already described above, preferably take place by form fit and/or substance bonding. Both the longitudinal member and the crossmember of the vehicle superstructure, and also the structural elements of the structural component, have corresponding connection devices.

With respect to structure-related definitions of terms, and the effects and advantages of those features, reference is made to the full extent to the above explanations of corresponding definitions, effects and advantages relating to the structural component. Disclosures herein concerning the structural component according to the disclosure may be transferred accordingly to the definition of the vehicle superstructure according to the disclosure unless expressly excluded herein. Also, disclosures herein concerning the vehicle superstructure according to the disclosure may be used correspondingly for definition of the structural component according to the disclosure, also unless expressly excluded herein.

An advantageous embodiment of the disclosure furthermore provides that the connection between the structural support web and the longitudinal member and/or between at least one of the longitudinal structural elements and the transverse structural element are/is configured as a predetermined break connection which yields when a predefined force load is exceeded. In this way, both a defined, initially high resistance to a plastic deformation of the structural component arranged on the vehicle superstructure may be achieved, but when a specific maximum load is exceeded, a plastic deformation of the structural component or parts thereof is permitted in a specific preferential direction, for example in the transverse extension direction. Thus firstly collision energy is absorbed, and secondly a controlled lateral shift (e.g. in the vehicle transverse direction, Y spatial direction) of the drive train acting against the structural component is possible. The lateral shift movement of the drive train in the vehicle transverse direction thus takes place substantially parallel to a bulkhead which also runs in the vehicle transverse direction, so that penetration of the drive train into the vehicle interior is effectively prevented.

To form a predetermined break connection between structural elements of the structural component, for example the transverse structural element could be configured strip-like with corresponding cross-sectional area. Also, correspondingly formed cross-sectional constrictions may be provided on a structural component configured as a hollow or strip profile.

In one example, the entire structural component according to the disclosure comprises of a metal material, wherein the individual structural elements i.e. longitudinal structural elements, transverse structural element and structural support web, may be made of the same material or different metallic materials. It is also conceivable that the entire structural component or at least individual parts or structural elements thereof are made from a material other than metal.

FIGS. 1-10B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In the various figures, parts of equivalent function are labeled with the same reference signs and may be only described once.

In the different figures, furthermore three spatial directions X, Y and Z, and H, L and Q are indicated in order to specify an orientation of the objects depicted in each case. The spatial directions X, Y and Z each refer to the usual extension directions of a vehicle superstructure or parts thereof, and spatial directions H, L and Q refer to the extension directions relative to a structural component according to the disclosure.

Figure 1:
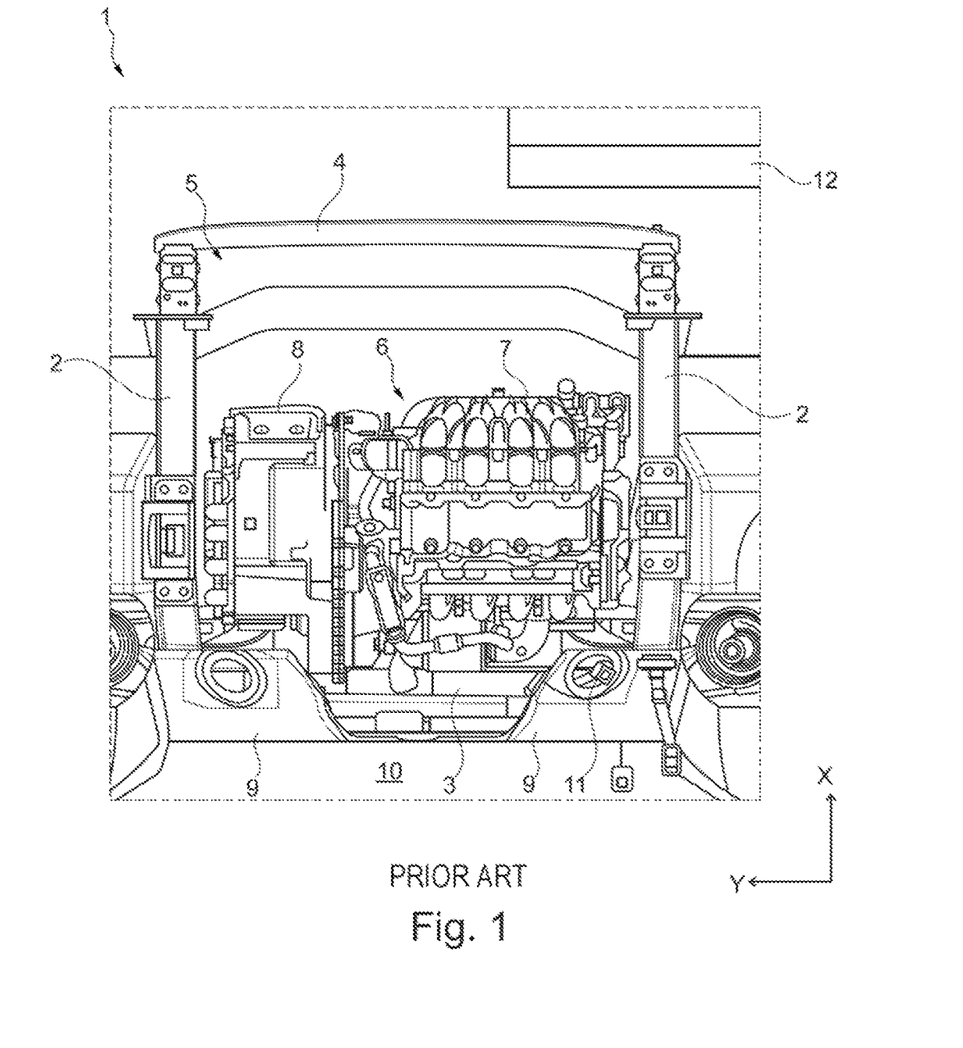
FIG. 1 shows a top view of a frontal portion of a vehicle superstructure according to the prior art before a frontal collision with side offset.

FIG. 1 shows diagrammatically a top view of the frontal portion 1 of a vehicle superstructure, according to the prior art, of a vehicle or motor vehicle (not otherwise shown in detail) before a frontal collision with a side offset. Of the frontal portion 1 of the vehicle superstructure, FIG. 1 shows two longitudinal members 2 (one on a first, left side and one on a second, right side) and a crossmember 3 running transversely to the longitudinal members 2 and connecting the two longitudinal members 2 together (e.g., coupled to each of the two longitudinal members 2 at opposite extreme ends of the crossmember 3). A bumper 4 is attached to the vehicle front between the front ends of the two longitudinal members 2. The frontal portion 1 of the vehicle superstructure substantially establishes an engine bay 5 of the vehicle, in which a drive train 6 (depicted in FIG. 1) with internal combustion engine 7 and transmission 8 is arranged and accommodated. Furthermore, FIG. 1 shows part of a bulkhead 9 which substantially delimits the engine bay 5 from a passenger cell 10 or vehicle interior 10. FIG. 1 furthermore shows a portion of the steering column 11 which, in the view shown of FIG. 1, extends from top to bottom through a part of the bulkhead 9. In the frontal portion 1 (shown in FIG. 1) of the vehicle superstructure according to the prior art, the steering column 11 is arranged on the right-hand side of the vehicle (right-hand drive). It is understood that the steering column 11 may also be arranged on the left-hand side of the vehicle (left-hand drive) for a vehicle intended to be driven on the right-hand side of the road.

A deformable barrier 12 is shown physically in front of the frontal portion 1 of the vehicle superstructure or bumper 4 in the situation shown in FIG. 1. It can be clearly seen that the barrier 12 has a side offset from the middle of the vehicle superstructure 1 or vehicle. The overlap of the barrier 12 with the width of the vehicle front is around 40% in the case shown in FIG. 1.

Figures 2A, 2B:
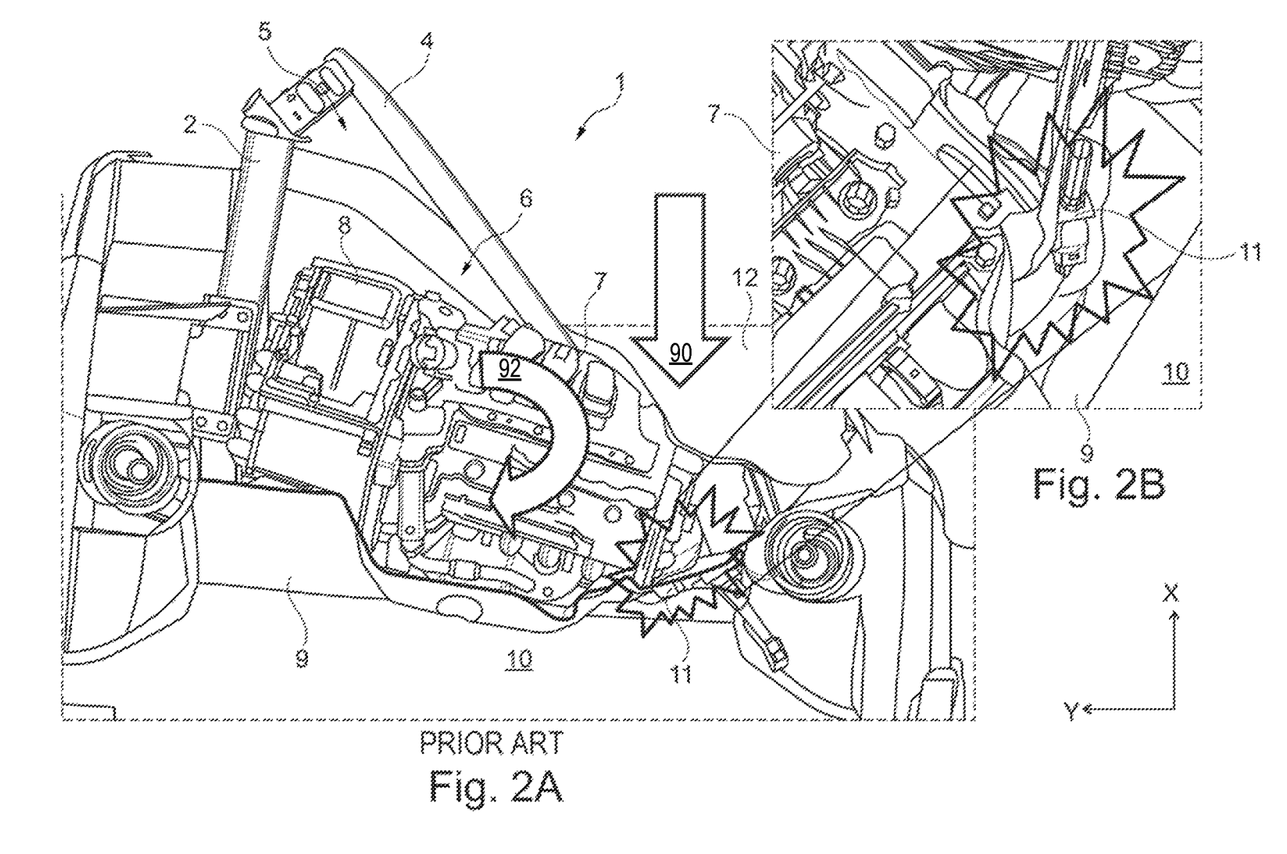
FIGS. 2A and 2B show top views of the frontal portion of the vehicle superstructure from FIG. 1 after a frontal collision with side offset.

FIGS. 2A and 2B each show diagrammatically a top view of the frontal portion 1 of the vehicle superstructure from FIG. 1 after a frontal collision with side offset with the barrier 12, wherein FIG. 2B shows an enlarged extract view from FIG. 2A. The figure clearly shows a rotation of the drive train 6 (engine 7 and transmission 8) about its vertical axis, i.e. about the Z-axis standing perpendicularly to the two spatial axes X and Y visible in FIG. 2A) which results after the barrier 12 has at least partially entered into the engine bay 5. In a vehicle superstructure such as that shown in the prior art, the rotation of the drive train 6 thus leads to substantial deformation of the bulkhead 9 in the region of the steering column 11, which firstly may reduce a distance between it and the vehicle interior 10, in particular in the foot and leg region, and in addition can cause a shift of the steering column 11 toward the vehicle interior 10. Arrow 90 illustrates a direction of force of the collision and arrow 92 illustrates a direction of rotation of the drive train 6.

Figure 3:
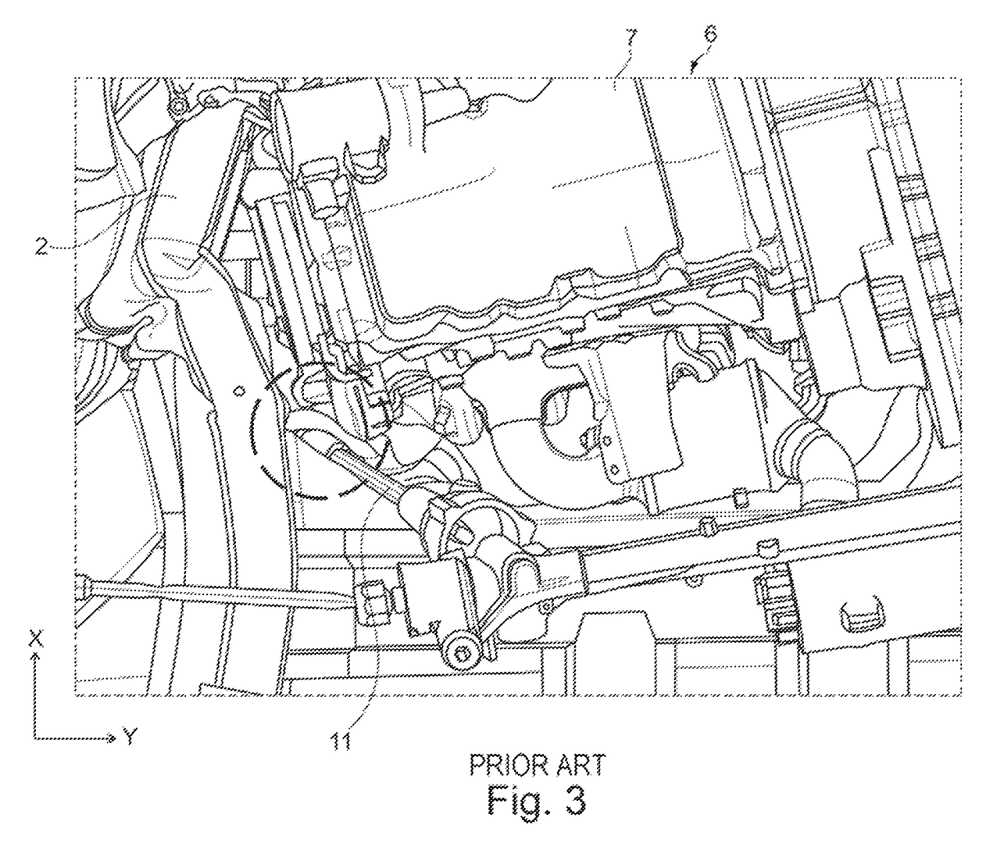
FIG. 3 shows a view from below of the frontal portion of the vehicle superstructure from FIG. 1 after a frontal collision with side offset.

FIG. 3 shows a view from below onto the frontal portion 1 of the vehicle superstructure from FIG. 1 after the frontal collision with side offset with the barrier 12, i.e. in the situation shown in FIGS. 2A and 2B. The drawing shows the force transfer, caused by rotation of the drive train 6 or engine 7, into the steering column 11 (dotted circular line) which may lead to an undesirable movement of the steering column 11 toward the vehicle interior 10 and/or to an interruption in the mechanical connection between the steering wheel (not visible in FIG. 3) and the steered wheels (also not shown) of the vehicle.

Figure 4:
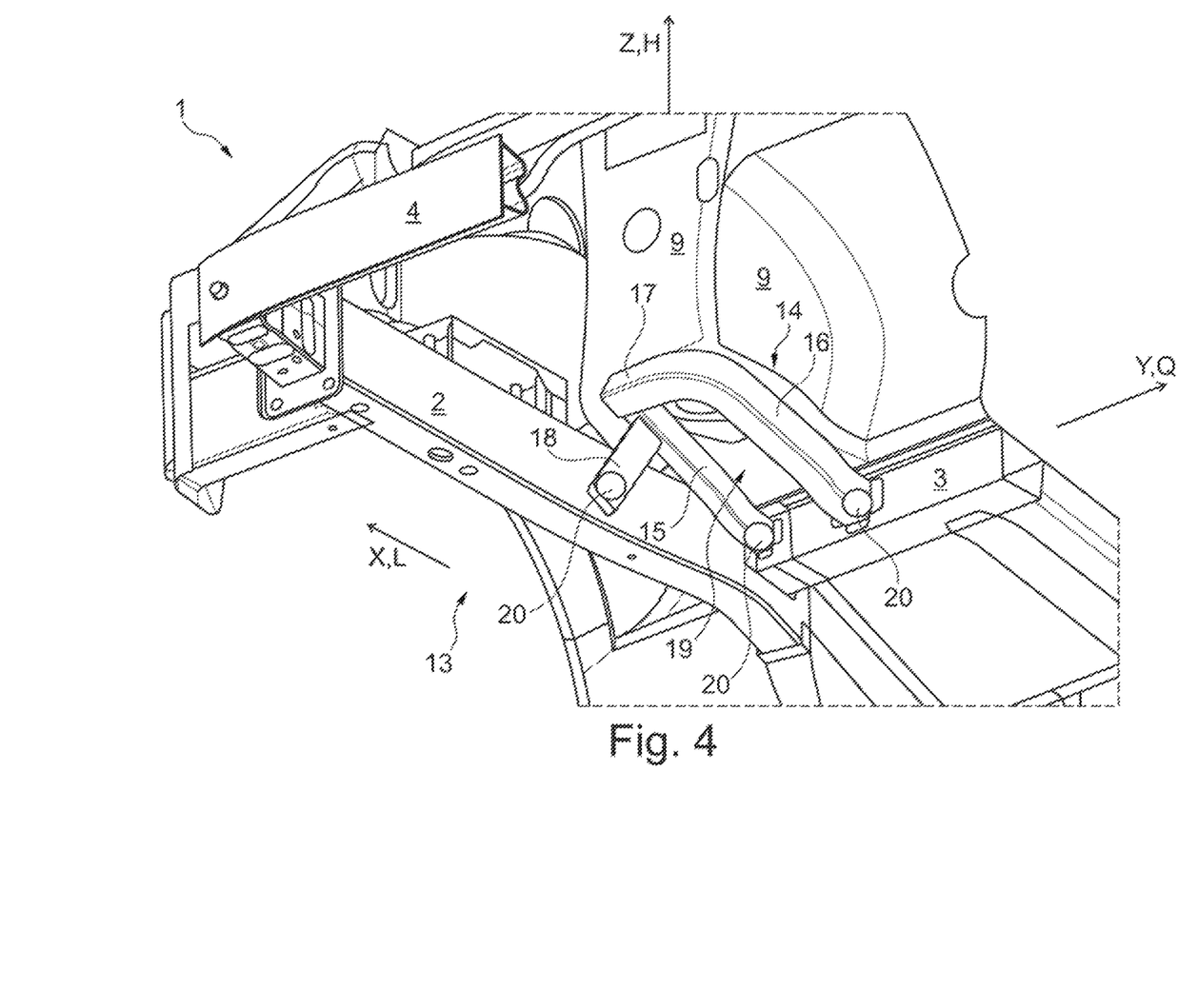
FIG. 4 shows a perspective view from obliquely below of a frontal portion of an exemplary embodiment of the vehicle superstructure according to the invention, with an exemplary embodiment of a structural component according to the invention attached thereto.

FIG. 4 shows a perspective view from obliquely below onto a frontal portion 1 of an exemplary embodiment of the vehicle superstructure 13, according to the present disclosure, of a vehicle (not shown in detail), in particular a motor vehicle, with an exemplary embodiment of a structural component 14 according to the disclosure attached thereto. As FIG. 4 shows, the structural component 14 has a first and a second elongate, longitudinal structural element 15, 16, respectively, which are spaced apart from each other and extend substantially in the same longitudinal direction L. Furthermore, the structural component 14 has an elongate transverse structural element 17 connecting the two longitudinal structural elements 15, 16 together (in the present case, connecting these at the end) and extending substantially transversely to the two longitudinal structural elements 15, 16 (in the present case, in the transverse direction Q), and finally an elongate structural support web 18 which extends substantially both transversely to the two longitudinal structural elements 15, 16 and also transversely to the transverse structural element 17 (in the present case, substantially in the vertical direction H).

As FIG. 4 shows, the two longitudinal structural elements 15, 16 and the transverse structural element 17 form a U-shape. In particular, the two longitudinal structural elements 15, 16 and the transverse structural element 17 of the structural component 14 shown in FIG. 4 establish between them the periphery of an opening 19. Also, in the present exemplary embodiment, the transverse structural element 17 is formed integrally with the second longitudinal structural element 16, wherein the two structural elements 16 and 17 are formed by forming of a single workpiece. The first longitudinal structural element 15 and the structural support web 18 may be connected to the rest of the structural component 14 via the connection techniques mentioned herein (e.g. by form fit and/or substance bonding).

Furthermore, in the exemplary embodiment of the structural component 14 shown in FIG. 4, the first and second longitudinal structural elements 15, 16 and the transverse structural element 17 and the structural support web 18 are each formed as profiled webs (in the present case, with rectangular or square cross-section), wherein the two longitudinal structural elements 15, 16 and the transverse structural element 17 have a hollow profile, and the structural support web 18 has a solid profile.

As further evident from FIG. 4, the two longitudinal structural elements 15, 16 and the structural support web 18 are each configured to be connected to the superstructure 13 of the vehicle. Both the vehicle superstructure 13 and the structural component 14 for this have corresponding fixing or connecting devices 20, which are shown merely symbolically in FIG. 4. Although the connecting devices 20 in FIG. 4 are indicated only by a single reference sign, the individual connecting devices 20 may be configured differently. For example, the connecting device 20 of the structural support web 18 could be configured as a bore in order to create a form-fit connection (e.g. bolted or riveted) between the structural support web 18 and the vehicle superstructure 13, in particular the longitudinal member 2, while the connecting devices 20 of the two longitudinal structural elements 15, 16 may for example each be configured as connecting flanges in order to create a substance-bonded connection (e.g. welding or bonding) between the longitudinal structural elements 15, 16 and the vehicle superstructure 13, in particular the crossmember 3.

With the vehicle superstructure 13 shown in FIG. 4, the structural support web 18 is connected to the inside of the longitudinal member 2, and the two longitudinal structural elements 15, 16 are each connected to the front side of the crossmember 3. It is also conceivable that the first longitudinal structural element 15 is, alternatively or additionally, connected to the inside of the longitudinal member 2. In this way, the first longitudinal structural element 15 and the second longitudinal structural element 16 extend in a direction away from a vehicle interior and toward the bumper 4.

Figure 5:
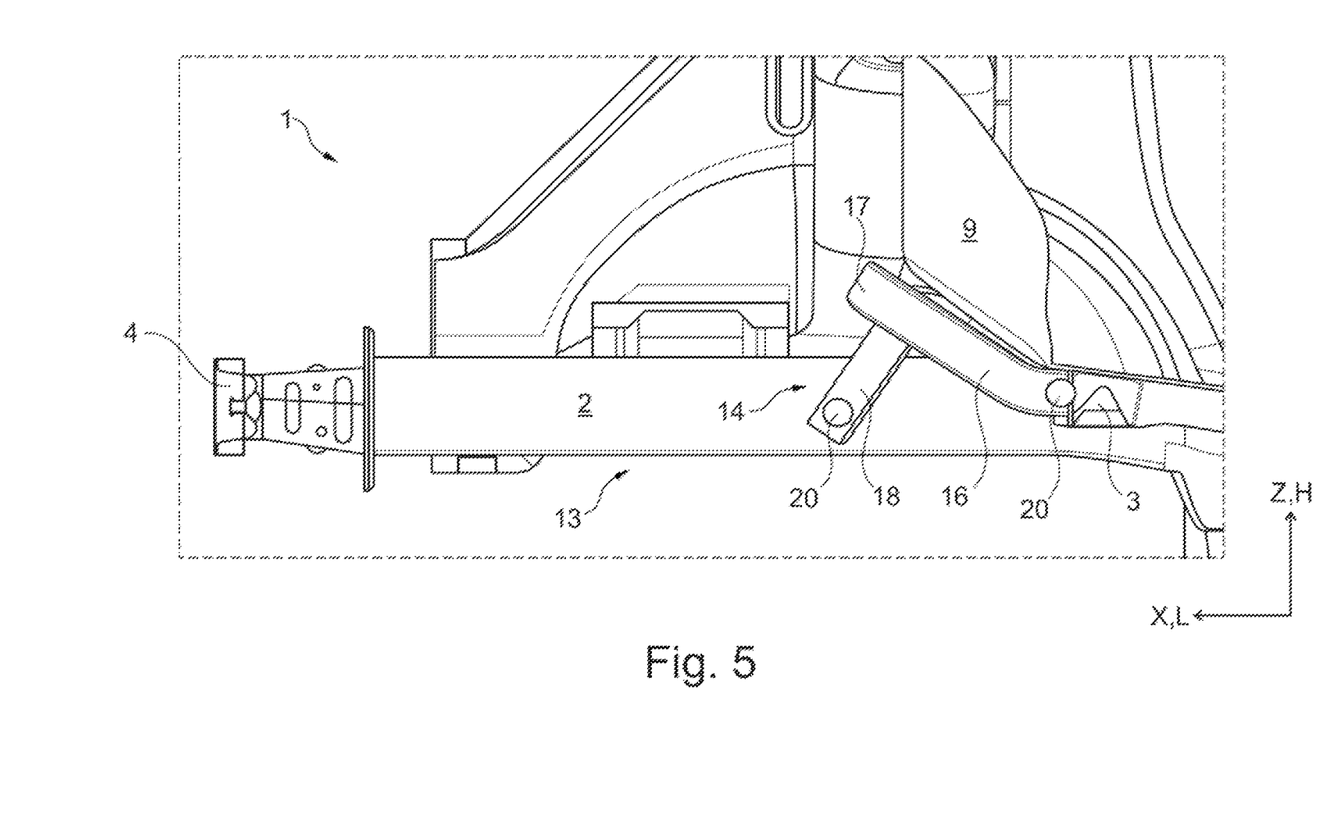
FIG. 5 shows a side view of the frontal portion of the vehicle superstructure from FIG. 4 with the structural component from FIG. 4.

FIG. 5 shows a side view of the frontal portion 1 of the vehicle superstructure 13 from FIG. 4 with the structural component 14 from FIG. 4. The support web 18 and the second longitudinal structural element 16 are angled to a direction of travel of the vehicle, wherein the direction of travel is parallel to the x axis and the longitudinal member 2. In one example, the support web 18 and the second longitudinal structural member 16 extend upward and away from a ground upon which the vehicle is arranged, wherein the angles of the support web 18 and the second longitudinal structural member 16 may be complementary angles. As illustrated, the support web 18 is oriented in a direction normal to the second longitudinal structural member 16.

Figure 6A:
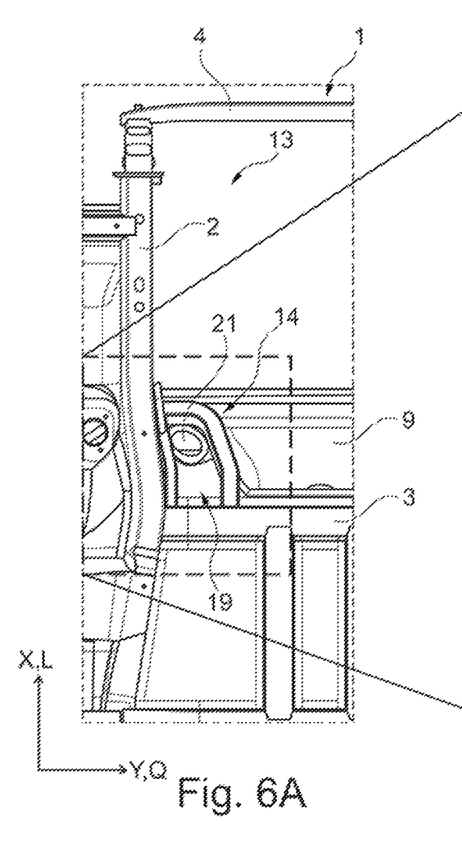
FIGS. 6A and 6B show views from below of the frontal portion of the vehicle superstructure from FIG. 4 with the structural component from FIG. 4.
Figure 6B:
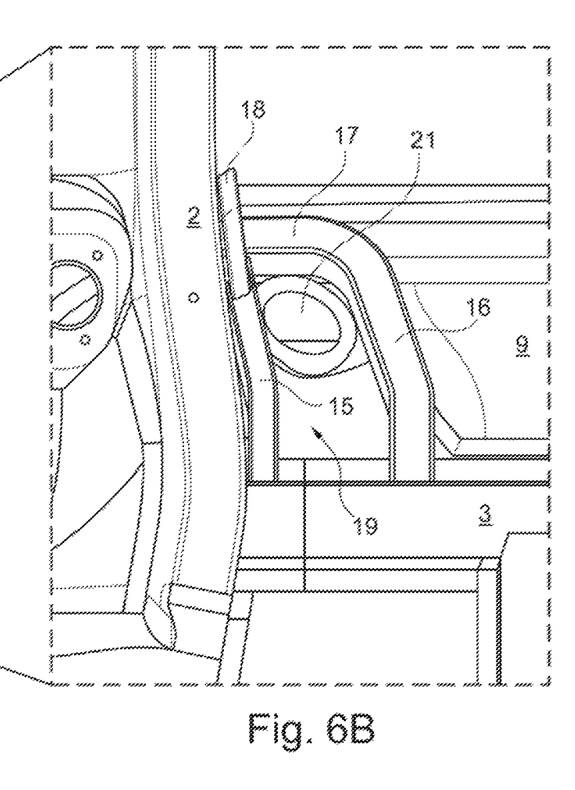

FIGS. 6A and 6B each show a view from below of the frontal portion 1 of the vehicle superstructure 13 from FIG. 4 with the structural component from FIG. 4, wherein FIG. 6B shows an enlarged extract view from FIG. 6A. It is clearly evident from FIG. 6 that a passage opening 21 is provided in the bulkhead 9, through which a steering column 11 (see also FIG. 7) shown in FIGS. 1 to 3 is guided. Advantageously, the structural component 14 is attached and fixed to the vehicle superstructure 13 such that the opening 19 formed by the structural elements 15, 16, 17 is arranged below the passage opening 21, so that the steering column 11 (FIG. 7) is surrounded in the manner of an arch by the structural elements 15, 16, 17 of the structural component 14, as is clearly also shown in FIG. 7.

Figure 7:
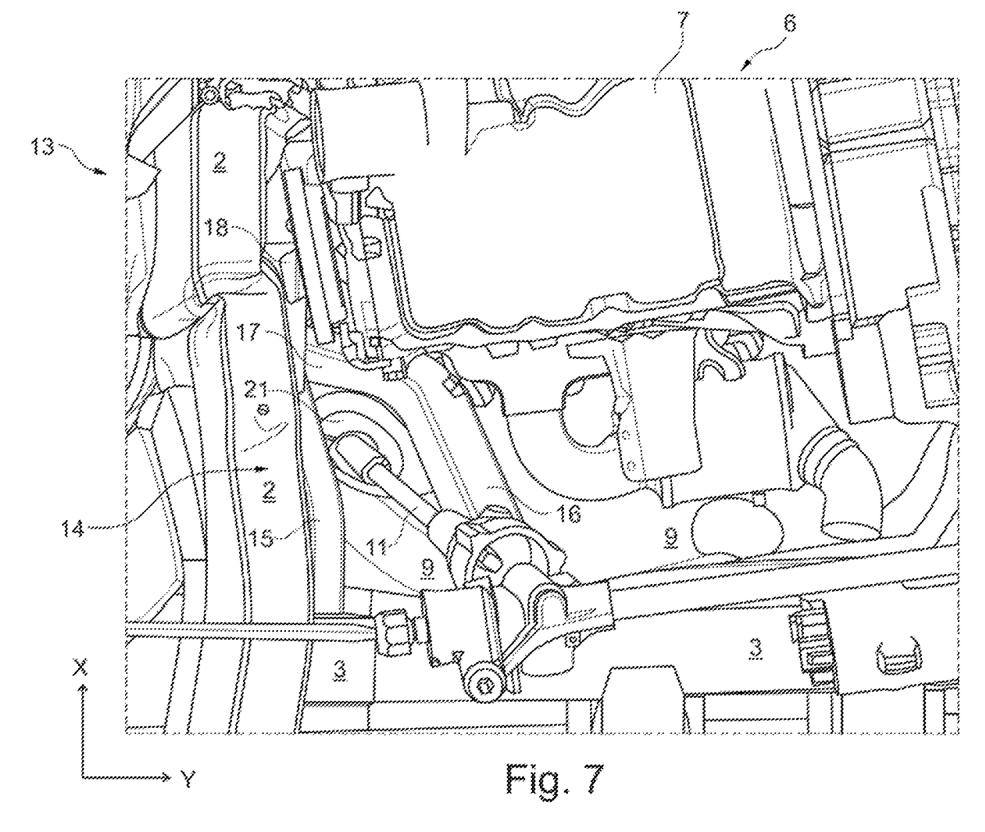
FIG. 7 shows a further view from below of the frontal portion of the vehicle superstructure from FIG. 4 with the structural component from FIG. 4, FIGS. 8A and 8B show firstly, a side view of the frontal portion of the vehicle superstructure from FIG. 4 with the structural component from FIG. 4, and secondly a further side view of only the structural component from FIG. 4, respectively.

FIG. 7 shows a further view from below of the frontal portion 1 of the vehicle superstructure 13 from FIG. 4 with the structural component 14 from FIG. 4. Comparison with the frontal portion 1 of the vehicle superstructure according to the prior art from FIG. 3 clearly shows that the steering column 11 is effectively protected by the structural component 14 according to the disclosure, which is arranged on the vehicle superstructure 13 according to the disclosure, from excessive, uncontrolled, and direct force transfer from the drive train 6 or engine 7 rotating under the effect of the frontal collision with the side offset with the barrier 12 (see FIGS. 1 and 2).

Figure 8A:
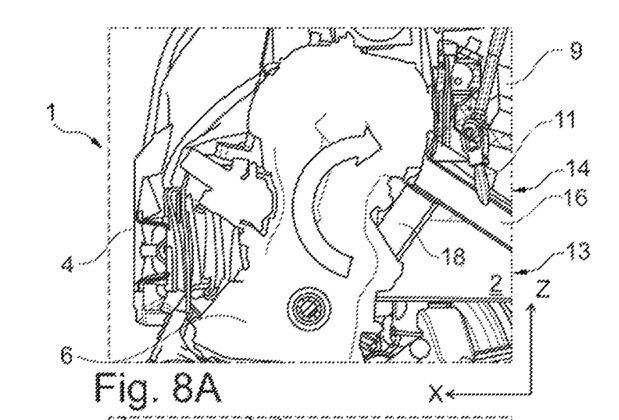
Figure 8B:
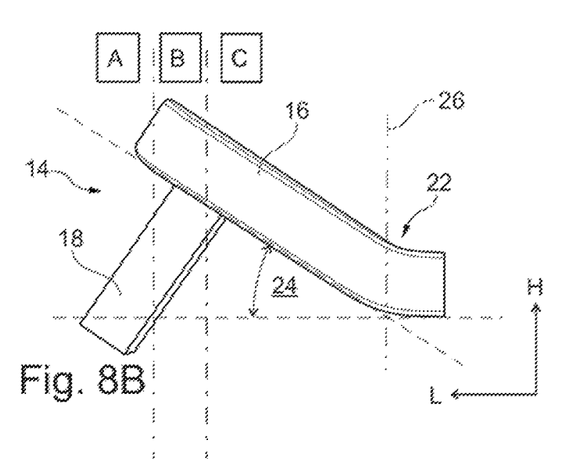

FIG. 8A shows a side view of the frontal portion 1 of the vehicle superstructure 13 from FIG. 4 with the structural component 14 from FIG. 4 on the inside of the longitudinal member 2. FIG. 8B shows a side view of only the structural component 14 from FIG. 4 from the same observation direction as FIG. 8A.

Figure 9A:
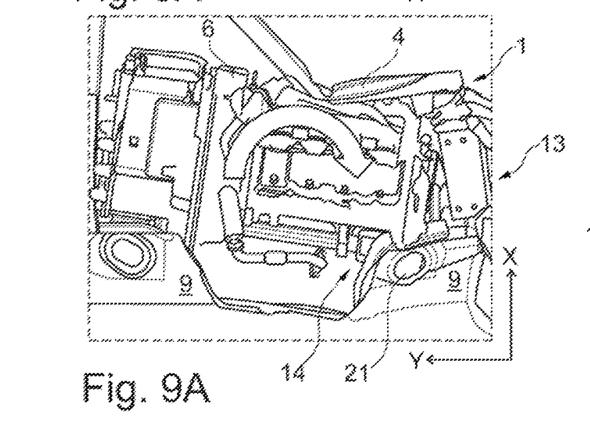
FIGS. 9A and 9B show firstly, a top view of the frontal portion of the vehicle superstructure from FIG. 4 with the structural component from FIG. 4, and secondly a further top view of only the structural component from FIG. 4, respectively.
Figure 9B:
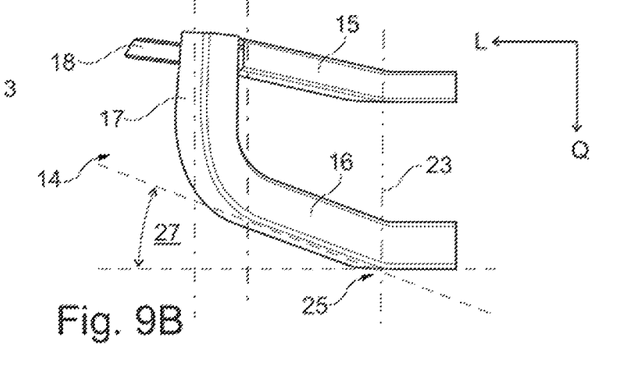

FIG. 9A shows a top view from above of the frontal portion 1 of the vehicle superstructure 13 from FIG. 4 with the structural component 14 from FIG. 4. FIG. 9B shows a further top view from above of only the structural component 14 from FIG. 4. It should be noted that the top view of the structural component 14 in FIG. 9B is rotated through 90° counterclockwise about the vertical axis Z or H relative to the top view shown in FIG. 9A.

It is clear from FIG. 8A that the structural component 14 attached to the vehicle superstructure 13 counters a rotation of the drive train 6 about its transverse axis Y following the frontal collision with side offset with the barrier 12 (see FIG. 1), and substantially stops or diverts this before the drive train 6 can reach the bulkhead 9 and deform this by force transfer of the collision energy. It is also evident in FIG. 8A that the steering column 11 is also protected by the structural component 14 from direct contact with the drive train 6 rotating about the Y-axis.

FIG. 9A shows that also a rotation of the drive train 6 about its vertical axis Z in a frontal collision with the barrier 12 is stopped in good time by the structural component 14, so that the bulkhead 9 undergoes no substantial deformation. It is also clearly evident that the opening 21 through which the steering column 11 is guided also undergoes no substantial deformation by the movement of the drive train 6, so that the steering column 11 is also protected from direct excessive force transfer of the collision energy from the drive train 6.

FIG. 8B shows that the longitudinal structural element 16 and the longitudinal structural element 15, arranged behind this in the view shown, each have a first bend 22 about a first bending axis 23 (FIG. 9B) which in the present case is oriented parallel to the transverse axis Q of the structural component 14. A bending angle 24 of the first bend 22 preferably amounts to at least a few degrees, e.g. at least around 5° or at least around 10°, and further preferably at most 45°.

Furthermore, the longitudinal structural element 16 according to FIG. 9B also has a second bend 25 about a second bending axis 26 (FIG. 8B), which in the present case runs parallel to the vertical axis H of the structural component 14. A bending angle 27 of the second bend 25 preferably amounts to at least a few degrees, e.g. at least around 5° or at least around 10°, and further preferably at most 45°.

Both the first bending axis 23 and the second bending axis 26 run perpendicularly to the longitudinal axis L of the structural component 14. Also, the two bending axes 23 and 26 run perpendicularly to each other. This gives the three-dimensionally expanded geometry of the structural component 14, evident in particular in the two views of FIGS. 8B and 9B, with which particular advantages can be achieved, in particular in three different portions A, B and C of the structural component 14 marked in FIGS. 8B and 9B. That is to say, the structural component may dissipate forces of the collision in a direction away from the vehicle interior and therefor the steering column, which may result in less movement toward the vehicle interior due to the offset frontal collision.

The structural component 14 can thus, with respect to the movements of the drive train 6 shown in FIGS. 8A and 9A in the case of a frontal collision, be designed with a progressive resistance or strength against its plastic deformation, creating a resistance of the structural component 14 against the drive train 6 which increases depending on the amount of the movement/rotation already executed by the drive train 6.

On a frontal collision, the first contact of the penetrating drive train 6 with the structural component 14 takes place in the first (frontal) portion A of the structural component 14. The longitudinal extension of the structural support web 18, which is oriented sloping relative to the vertical axis H, firstly causes a relatively slowly increasing resistance of the structural component 14 against the collision-induced movement of the penetrating drive train 6 ("soft contact"). In the second portion B, the drive train 6 comes into contact with the transverse structural element 17 which brakes the collision-induced movement of the drive train 6 significantly more strongly than in portion A. In portion C, the two longitudinal structural elements 15, 16, because of their orientation substantially in the longitudinal direction L of the structural component 14 or X of the vehicle superstructure 13, act as thrust rods acting in the direction directly opposite the movement direction of the drive train 6, and thus generate a highest resistance of the structural component 14 against the drive train 6.

It is to be noted that, the geometric design of the structural component 14, for example the number, arrangement and amount of the bends, material thicknesses and cross-sections of the individual structural components etc., the progressive resistance behavior of the structural component 14 can be adapted in targeted fashion as desired for the particular application. As such, a bend amount and a number of bends may be modified based on drive train movement characteristics for offset frontal collisions in other vehicle geometries.

Figure 10A:
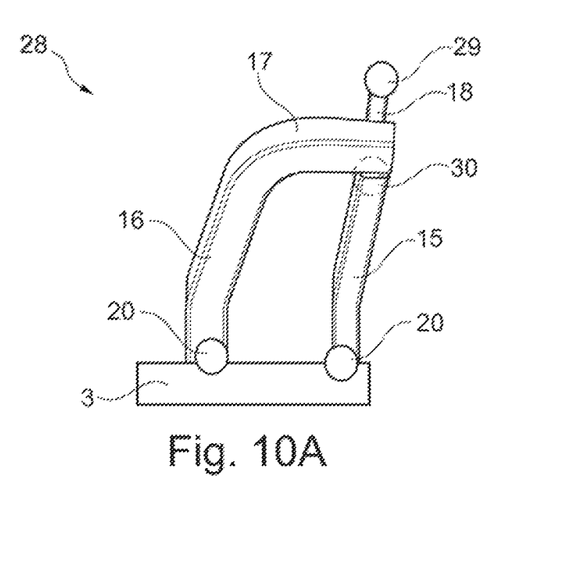
FIGS. 10A and 10B show a top view of a further exemplary embodiment of a structural component in two different deformation stages.
Figure 10B:
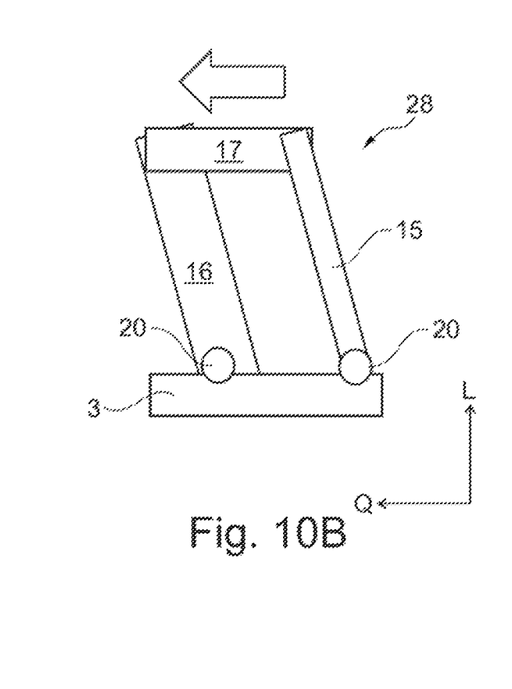

FIGS. 10A and 10B each show a top view of a further exemplary embodiment of a structural component 28 in two different deformation stages. The structural component 28 differs from the structural component 14 described above substantially only by a connecting device 29 via which the structural support web 18 is attached to the longitudinal member 2 (FIG. 4), and which is configured as a predetermined break connection which yields when a predefined maximum force loading between the structural support web 18 and the longitudinal member 2 is exceeded.

In addition or alternatively, the structural component 28 may also have a predetermined break connection 30 in the connecting region between the transverse structural element 17 and the first longitudinal structural element 15, so that the connection between these elements 15, 17 yields when a maximum load is exceeded.

In both above-mentioned cases, in the state installed on the vehicle superstructure 13, the structural component 28 may deform after yielding of the predetermined break connection 29 and/or 30, in the transverse direction Q, in particular in the vehicle transverse direction Y, towards the vehicle center and in this way absorb collision energy by deformation work. The connecting devices 20 here transfer the torque generated into the crossmember 3 of the vehicle superstructure 13. The drive train 6 acting against the transverse structural element 17 in a frontal collision is also shifted sideways in the vehicle transverse direction Y by the laterally oriented deformation of the structural component 28.

The structural component according to the present disclosure disclosed herein, and the vehicle superstructure according to the present disclosure disclosed herein, are not restricted to the respective embodiments disclosed herein but also comprise further embodiments with the same function, which result from technically suitable further combinations of the features described herein of both the structural component and the vehicle superstructure. In particular, the features and feature combinations cited above in the general description and the description of the figures, and/or shown merely in the figures, may be used not only in the combinations are explicitly given herein but also in other combinations or alone without leaving the context of the present disclosure.

In a preferred embodiment, the structural component according to the disclosure is used on a vehicle superstructure of a vehicle, in particular a motor vehicle, wherein as described above it is arranged in particular at a vehicle front in a corner region, in which a crossmember of the vehicle superstructure is connected to a longitudinal member of the vehicle superstructure, and is connected to both the crossmember and to the longitudinal member in order to prevent or at least substantially reduce a deformation of a bulkhead caused by a collision-induced shift and/or rotation of a drive train of the vehicle in a frontal collision, in particular a frontal collision with side offset.

In this way, a structural component may be arranged on a side of a vehicle corresponding to a side in which a steering column is arranged. The structural component may be configured to extend around the steering column and block movement of a drive train toward the steering column. The technical effect of the structural component is to adjust a movement of the drive train during an offset frontal vehicle collision to mitigate its contact with the steering column and entry into a vehicle interior.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A structural component for a superstructure of a vehicle, comprising:
a first and a second elongate longitudinal structural element spaced apart from each other and extending in a same longitudinal direction, an elongate transverse structural element which connects the first and the second elongate longitudinal structural elements together and extends transversely to the first and second elongate longitudinal structural elements, and an elongate structural support web which extends both transversely to the first and second elongate longitudinal structural elements and to the transverse structural element, wherein the first and second elongate longitudinal structural elements and the structural support web are each configured to be connected to the superstructure of the vehicle, and wherein the structural support web is transverse to each of the first and second elongate longitudinal structural elements and to the elongate transverse structural element.

2. The structural component of claim 1, wherein the first and second elongate longitudinal structural elements and the transverse structural element substantially form a U-shape.

3. The structural component of claim 1, wherein the transverse structural element is configured integrally with at least one of the first and second elongate longitudinal structural elements and is formed by corresponding forming of a single workpiece, and/or the structural support web is formed integrally with at least one of the first and second elongate longitudinal structural elements and is formed by corresponding forming of a single workpiece.

4. The structural component of claim 1, wherein one or more of the first elongate longitudinal structural element, the second elongate longitudinal structural element, the transverse structural element, and the structural support web is configured as a profile web.

5. The structural component of claim 4, wherein the profile web is hollow.

6. The structural component of claim 1, wherein the transverse structural element is configured as a strip.

7. The structural component of claim 1, wherein the first and second elongate longitudinal structural elements and the transverse structural element shape a perimeter of an opening.

8. The structural component of claim 1, wherein the first elongate longitudinal structural element has a first bend about a first bending axis, and wherein the second elongate longitudinal structural element has a second bend about a second bending axis.

9. A vehicle superstructure having a longitudinal member and a crossmember connected thereto and running substantially transversely thereto, the vehicle superstructure, comprising:
a structural component coupled to a longitudinal member and a crossmember, wherein a structural support web of the structural component is connected to the longitudinal member and a first of two longitudinal structural elements of the structural component is connected to the crossmember and a second of two longitudinal structural elements is connected to the crossmember or to the longitudinal member, and wherein the structural support web is transverse to each of the longitudinal member and the crossmember.

10. The vehicle superstructure of claim 9, wherein one or more of a first connection between the structural support web and the longitudinal member and a second connection between at least one of the longitudinal structural elements and the transverse structural element is configured as a predetermined break connection which yields when a predefined force load is exceeded.

11. A system, comprising:
a structural component arranged in a front end of a vehicle between a steering column and a front bumper, wherein the structural component is physically coupled to a first longitudinal member and a cross-member, wherein the cross-member is physically coupled to the first longitudinal member and a second longitudinal member at opposite extreme ends, wherein the structural component comprises a first longitudinal structural element, a second longitudinal structural element, and a transverse structural element extending from the second longitudinal member to the first longitudinal member, the transverse structural element transverse to both the first longitudinal member and the second longitudinal member, and further comprising a support web coupled to the first longitudinal member and transverse to each of the first longitudinal member, the second longitudinal member, and the transverse structural element.

12. The system of claim 11, wherein the structural component comprises a U-shape.

13. The system of claim 11, wherein the structural component comprises an opening through which the steering column extends.

14. The system of claim 11, wherein the support web and the first longitudinal structural element extend at an angle relative to the first longitudinal member.

15. The system of claim 11, wherein the structural component extends in a direction away from a ground on which the vehicle is arranged.

16. The system of claim 11, wherein the structural component is a single-piece.

17. The system of claim 11, wherein the structural component comprises one or more weakened positions configured to yield at a desired angle.

18. The system of claim 11, wherein the structural component at least partially surrounds the steering column.

* * * * *